United States Patent
Addeo et al.

(10) Patent No.: US 8,462,640 B2
(45) Date of Patent: *Jun. 11, 2013

(54) METHOD OF MONITORING A TANDEM CONNECTION IN A MULTI-PROTOCOL LABEL SWITCHING (MPLS) TELECOMMUNICATION NETWORK

(75) Inventors: Christian Addeo, Pordenone (IT); Alberto Bellato, Bernareggio (IT); Italo Busi, Cerro Maggiore (IT); Maarten Vissers, Huizen (NL)

(73) Assignee: Alcatel Lucent, Paris (FR)

( * ) Notice: Subject to any disclaimer, the term of this patent is extended or adjusted under 35 U.S.C. 154(b) by 266 days.

This patent is subject to a terminal disclaimer.

(21) Appl. No.: 12/930,621

(22) Filed: Jan. 12, 2011

(65) Prior Publication Data

US 2011/0128860 A1 Jun. 2, 2011

Related U.S. Application Data

(63) Continuation of application No. 11/483,086, filed on Jul. 10, 2006, now Pat. No. 7,903,565.

(30) Foreign Application Priority Data

Aug. 12, 2005 (IT) .............................. MI2005A1570
Apr. 18, 2006 (EP) ..................................... 06075897

(51) Int. Cl.
H04L 12/26 (2006.01)

(52) U.S. Cl.
USPC ...................................... 370/241.1; 370/236.2

(58) Field of Classification Search
None
See application file for complete search history.

(56) References Cited

U.S. PATENT DOCUMENTS 7,373,401 B1 * 5/2008 Azad ............................. 709/224
2005/0147050 A1 * 7/2005 Klink ............................ 370/244

* cited by examiner

*Primary Examiner* — Kevin C Harper
*Assistant Examiner* — Rhonda Murphy
(74) *Attorney, Agent, or Firm* — Carmen Patti Law Group, LLC

(57) ABSTRACT

It is disclosed a method of monitoring, a Multi-Protocol Label Switching network, a tandem connection of a Label Switched Path. The tandem connection to be monitored has an input node and an output node. The method comprises the following steps: receiving a first Operation Administration Management packet at the input node; and generating a second OAM packet at the input node. According to the invention, the following steps are further performed: a tandem connection header is inserted into the first OAM packet; both the first OAM packet with the tandem connection header and the second OAM packet are sent towards the output node; and the second OAM packet is identified according to the presence or absence of said tandem connection header.

11 Claims, 5 Drawing Sheets

METHOD OF MONITORING A TANDEM CONNECTION IN A MULTI-PROTOCOL LABEL SWITCHING (MPLS) TELECOMMUNICATION NETWORK

CROSS-REFERENCE TO RELATED APPLICATION

This application is a continuation application of U.S. Ser. No. 11/483,086, filed Jul. 10, 2006 now U.S. Pat. No. 7,903,565, and assigned to the same assignee as the parent application.

FIELD OF THE INVENTION

The present invention relates to the telecommunication field. More particularly, the present invention relates to a method of monitoring a tandem connection in a Multi-Protocol Label Switching telecommunication network. The invention further relates to network nodes which are adapted to implement such a method and to an MPLS network comprising such nodes.

This application is based on and claims the benefit of Italian Patent Application no. MI2005A001570 filed on Aug. 12, 2005 and European Patent Application no. 06075897.6 filed on Apr. 18, 2006, which are incoporated by reference herein.

BACKGROUND OF THE INVENTION

In packet-switched telecommunication networks, user data are divided into packets, each packet being routed from a source node to a termination node through a path comprising a plurality of intermediate nodes.

The path each packet follows from the source node to the termination node can be dynamically determined hop-by-hop, as it happens for instance in IP (Internet Protocol) networks.

Alternatively, the path of a packet may be determined before the packet transmission. This usually happens in MPLS (Multi-Protocol Label Switching), which are defined by the Request for Comments RFC3031, January 2001.

In MPLS networks, the path defined between the source node and the termination node is termed Label Switched Path (briefly LSP in the following description).

In a MPLS network, the source node of an LSP path assigns to each packet to be transmitted a switching header comprising a first label, and it sends the packet to the first intermediate node of the determined LSP path. The first intermediate node, according to the value of such a first label, sends the packet to the second intermediate node of the LSP path, after replacing the first label with a second label which can be read by the second intermediate node. And so on, until the packet reaches the termination node, which removes the packet header and it processes the user information comprised therein.

Therefore, source nodes and termination nodes are adapted to create and remove the switching header comprising the label, respectively. On the other hand, intermediate nodes are adapted to replace the label comprised into the switching header of the received packet with a different label which can be read by the following intermediate node.

In MPLS networks, it is known to monitor an LSP path by means of a set of functions which are termed OAM (Operation, Administration and Management). More particularly, such OAM functions are adapted to check the path integrity, the transmission performance along the path, or the like. The OAM functions in MPLS networks are standardized by the ITU-T Recommendation Y.1711, February 2004.

According to this Recommendation, the OAM functions are performed by transmitting particular packets along the LSP path to be monitored, which are termed OAM packets. Such OAM packets are periodically transmitted from the source node to the termination node along the LSP path to be monitored.

Each OAM packet comprises, besides the switching header, an OAM header, whose label is equal to a predefined value (14, according to the ITU-T Y.1711), for distinguishing OAM packets from user packets. Such OAM header is placed after the switching header. Further, the payload of such OAM packets comprises a field, which is termed TTSI (Trail Termination Source Identifier), which in turn comprises two fields LSR-ID and LSP-ID of sixteen and four bytes, respectively, which comprise the identifier of the LSP path source node and the identifier of the LSP path, respectively.

When an operator transmits user data from a source node to a termination node, it can be useful to evaluate transmission performance both along the entire LSP path, and along one or more sections thereof. Generally speaking, a section of a path (i.e. the sequence of two or more succeeding nodes) is termed "tandem connection".

Monitoring a tandem connection is particularly interesting when, for instance, a path between a source node and a termination node of a network operator comprises one or more tandem connections which are managed by other operators. Indeed, in case of faults or reception errors, it is important, for the operator which is responsible for the transmission along the entire path, to determine whether the fault/error occurred on a network section within its own competence or within the competence of another operator. Also the operator which is responsible for the tandem connection is interested in monitoring its own tandem connection.

Therefore, there is the need, for an operator, to have the capability of monitoring simultaneously both an entire path and tandem connections of such a path.

In particular, in the MPLS network field, Huawei Technologies Co. Ltd, in the document entitled "Proposal for MPLS administrative domain", submitted at ITU-T SG13 Plenary Meeting, COM13-D104-E (Apr. 25-May 6, 2005) proposed to monitor a section of an LSP path in a MPLS network as follows. In each domain, the input node of the domain may insert a so-called "per-domain OAM packet" into the LSP containing the tandem connection to be monitored. The "per-domain OAM packet" uses similar format with the packet for monitoring the whole LSP, as defined by the above cited ITU-T Y.1711. However, in this "per-domain OAM packet", the TTSI field should be modified to the identifier of the input node of the tandem connection to be monitored. The output node of the tandem connection to be monitored thus monitors the value of the TTSI field, so that it can distinguish OAM packets for monitoring the whole LSP and "per-domain OAM packets".

This solution exhibits some drawbacks. First of all, such a solution is not compliant with the current MPLS apparatuses, as it requires a processing of the payload (in particular, the TTSI field) of the received OAM packets. Moreover, such a processing, even if it could be performed by the current MPLS apparatuses, would require the use of a significant amount of resources at each node, thus subtracting resources available for transmitting user packets.

SUMMARY OF THE INVENTION

Therefore, the general object of the present invention is providing a method of monitoring a tandem connection in a MPLS network which overcomes the aforesaid problems.

In particular, an object of the present invention is providing a method of monitoring a tandem connection in a MPLS network which can be implemented by current MPLS apparatuses, which requires a lower amount of resources in comparison with known methods, and which is quicker.

These and other objects are achieved by a method as set forth in the respective independent claims. Further advantageous features are set forth in the respective dependent claims. All the claims are deemed to be an integral part of the present description.

In a first aspect, the present invention provides a method of monitoring, in a Multi-Protocol Label Switching (MPLS) network, a tandem connection of a Label Switched Path (LSP). The tandem connection to be monitored has an input node and an output node. The method comprise the following steps: receiving a first Operation Administration Management (OAM) packet at the input node, and generating a second OAM packet at the input node. According to the invention, the following steps are further performed: a tandem connection header is inserted into the first OAM packet; the first OAM packet, with the tandem connection header, and the second OAM packet are sent to the output node; at said output node, the second OAM packet is identified according to the presence or absence of the tandem connection header.

Preferably, the tandem connection header is inserted in the first OAM packet after its switching header.

According to an advantageous embodiment, a predefined value is written in an experimental use field of the tandem connection header.

Preferably, a predefined value is written in a label field of the tandem connection header.

According to a second aspect, the present invention provides a network node of an MPLS network, wherein the network node is an input node of a tandem connection to be monitored. The network node is adapted to receive a first OAM packet to be sent to an output node of the tandem connection to be monitored, and to generate a second OAM packet to be sent to the output node. The node further comprises means for inserting into the first OAM packet a tandem connection header so that the second OAM packet can be identified at the output node of the tandem connection.

According to a third aspect, the present invention provides a network node of an MPLS network, wherein the network node is an output node of a tandem connection to be monitored. The network node is adapted to receive a first OAM packet generated upstream an input node of the tandem connection to be monitored and a second OAM packet generated at the input node. The node further comprises means for identifying said second OAM packet according to the presence or absence of a tandem connection header inserted at the input node.

According to a fourth aspect, the present invention provides an MPLS network comprising a tandem connection to be monitored, wherein the tandem connection comprises an input node as set forth above and an output node as set forth above.

BRIEF DESCRIPTION OF THE DRAWINGS

The invention will become more clear by reading the following description, given by way of example and not of limitation, to be read with reference to the accompanying drawings, wherein.

BEST MODE FOR CARRYING OUT THE INVENTION

Figure 1:
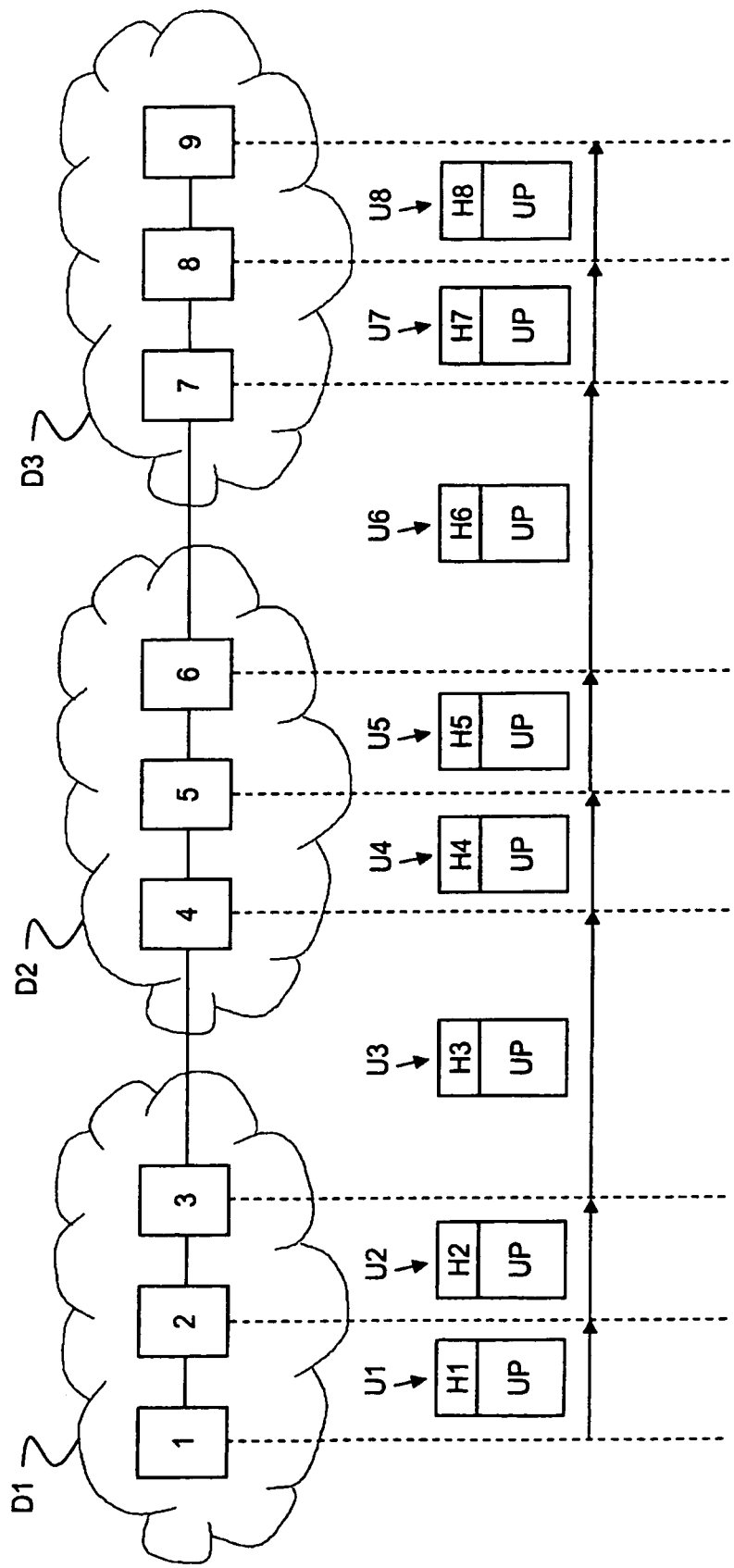
FIG. 1 schematically shows an MPLS network comprising three domains.

FIG. 1 schematically shows an exemplary MPLS network. Such an MPLS network comprises nine nodes 1, 2, . . . 9. For simplicity, the other nodes of the MPLS network are not shown in FIG. 1.

The nodes 1, 2, 3 are comprised in a first domain D1; the nodes 4, 5, 6 are comprised in a second domain D2; the nodes 7, 8, 9 are comprised in a third domain D3. The domains D1, D3 are managed by a first operator A, while the second domain D2 may be managed either by the first operator A or by a second operator B, as it will be shown in greater detail herein after.

In FIG. 1, it is assumed that the node 1 has to transmit user data to the node 9. The node 1 is the source node of the LSP path through which user packets are sent to node 9. Such an LSP path, shown in FIG. 1, comprises the cascade of the nodes 1, 2, 3 . . . 9.

As the source of the LSP path, node 1 inserts a first label to packets to be sent to node 2, indicated in FIG. 1 as packets U1. Therefore, each packet U1 includes a header H1 and a payload UP comprising user data, as schematically shown in FIG. 1. The header H1 of each packet U1 comprises, in addition to the label, other data, which are not further described since they are not relevant to the present description. The node 1 sends the packet U1 to the node 2.

The node 2, upon reception of the packet U1 from the node 1, replaces the first label comprised into the header H1 with a second label which is adapted to be processed by the node 3, thus forming a header H2, and it sends the so obtained packet U2 to the node 3. The node 3, upon reception of the packet U2 from the node 2, replaces the second label comprised into the header H2 with a third label which is adapted to be processed by the node 4, thus forming a header H3, and it sends the so obtained packet U3 to the node 4. And so on, until the node 9, which receives from the node 8 a packet U8 with a header H8, it removes the header H8 and it processes the user payload UP.

Figure 2:
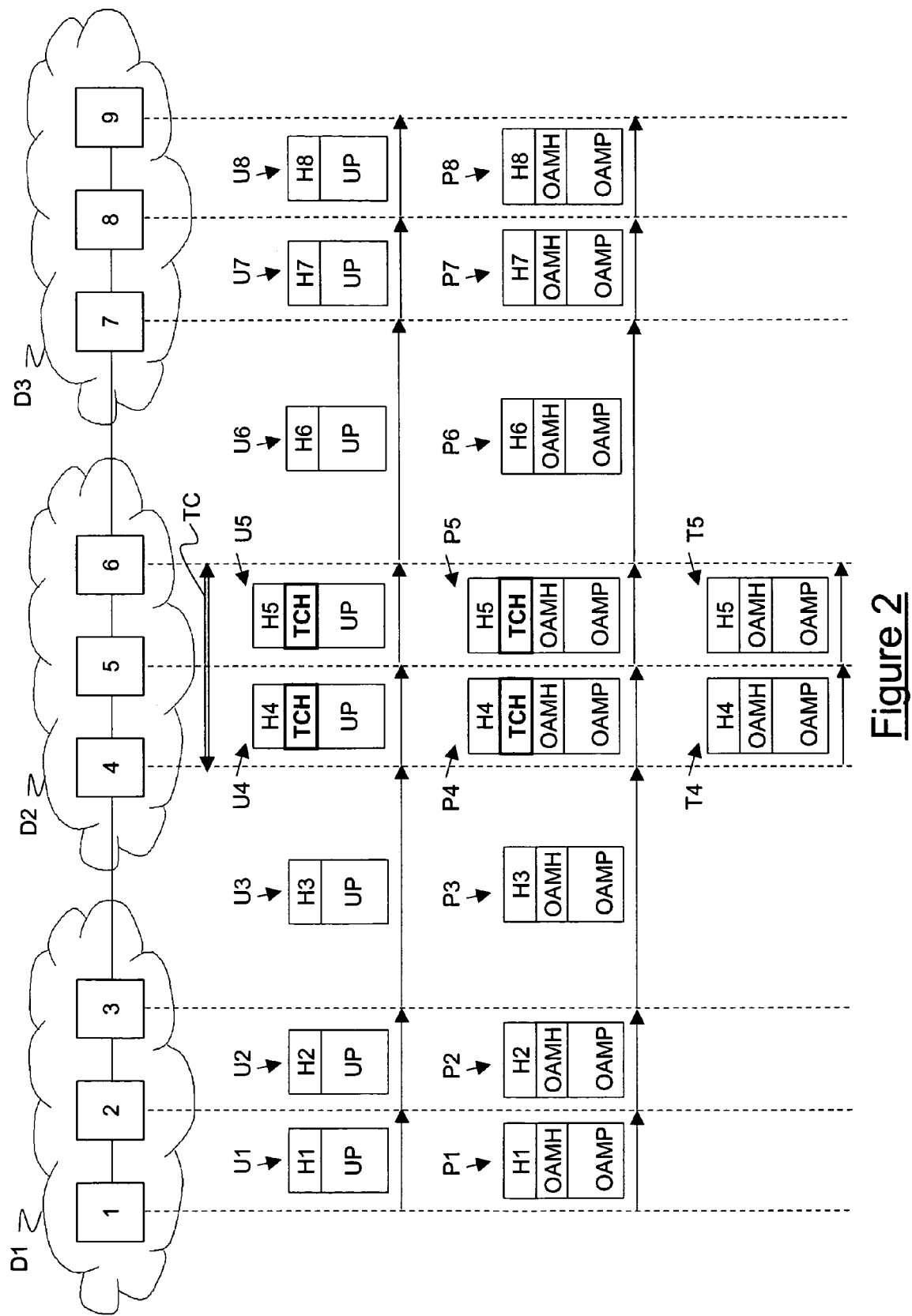
FIG. 2 schematically shows a first example of the method of monitoring a tandem connection applied to the network of FIG. 1, according to the present invention.

It is now assumed that the first operator A wishes to monitor both the whole LSP path of the user packets, and the tandem connection TC comprising the nodes 4, 5, 6, which is indicated by a double arrow in FIG. 2. For instance, in case the domain D2 is managed by the first operator A itself, the operator A may wish to monitor the tandem connection TC, the domain D2 being particularly critical (e.g., very high traffic flows, valuable traffic, or the like). In case the domain D2 is managed by a second operator B, the first operator A may wish to monitor the tandem connection TC for checking whether possible failures occur on network sections of its own or on network sections of the second operator B.

FIG. 2 schematically shows a first example of the method of monitoring the tandem connection TC applied to the network of FIG. 1 according to an embodiment of the present invention, under the assumption that also the domain D2 is managed by the first operator A.

The first operator A inserts a first flow of OAM packets, which will be termed herein after "flow of tandem connection OAM packets", along the LSP path through the input node (i.e. the first node) of the tandem connection to be monitored. Further, the operator A extracts such a flow of tandem connection OAM packets from the LSP path through the output node (i.e. the last node) of the tandem connection to be monitored. For instance, in FIG. 2, the input node of the tandem connection TC is the node 4, whilst the output node of the tandem connection TC is the node 6.

Therefore, the flow of tandem connection OAM packets goes through the whole tandem connection TC to be monitored.

In the following description, the expression "path OAM packets" will indicate a flow of packets generated by the source node of an LSP path for monitoring a whole LSP path, which are different from the above cited tandem connection OAM packets.

The input node 4 of the tandem connection TC is adapted to insert a tandem connection header in any packet (either user packet or path OAM packet) received from the node 3, which precedes it in the LSP path. Similarly, tandem connection output node 6 is adapted to remove a tandem connection header from any packet (either user packet, or path OAM packet, or tandem connection OAM packet) received from the node 5, which precedes it in the LSP path.

The Applicant has noticed that, for performing such operation of inserting a tandem connection header in a packet so that such a packet is still compliant with the MPLS standard even after the insertion of such a header, it is advantageous to employ a "label stacking" mechanism, which is provided by the MPLS standard, as described by the Request for Comments RFC3032, January 2001.

According to such a RFC3032, an MPLS packet may comprise more than one header, each header comprising a respective label. Each header (and each label comprised therein) corresponds to an LSP path of a different layer. More external headers correspond to higher path layers, while more internal headers correspond to lower path layers. Each node, for performing label switching, always processes the most external header. Each header comprises, in addition to the label, a stack bit, which indicates whether the current header is followed or not by a further header. In this manner, an arbitrary number of headers may be stacked.

Therefore, according to the above mentioned RFC3032, the input node from a lower layer path to a higher layer path inserts in front of each received packet a higher layer header, which temporally precedes the already existent lower layer header. Intermediate nodes of the higher layer path process the more external header, i.e. the higher layer header. The output node of the higher layer path removes the higher layer header, so that the following nodes, which belong to the lower layer path, process the most external header, i.e. the lower layer header.

However, according to the present invention, differently from the label stacking according to the above mentioned RFC3032, the input node of the tandem connection inserts such a tandem connection header after the already present switching header H1, H2, . . . , H8.

Therefore, the packet structure is compliant with the label stacking mechanism as defined by the RFC3032, January 2001. Moreover, as each node of the LSP path performs switching by processing the most external header, the switching mechanism is unchanged.

Figure 3:
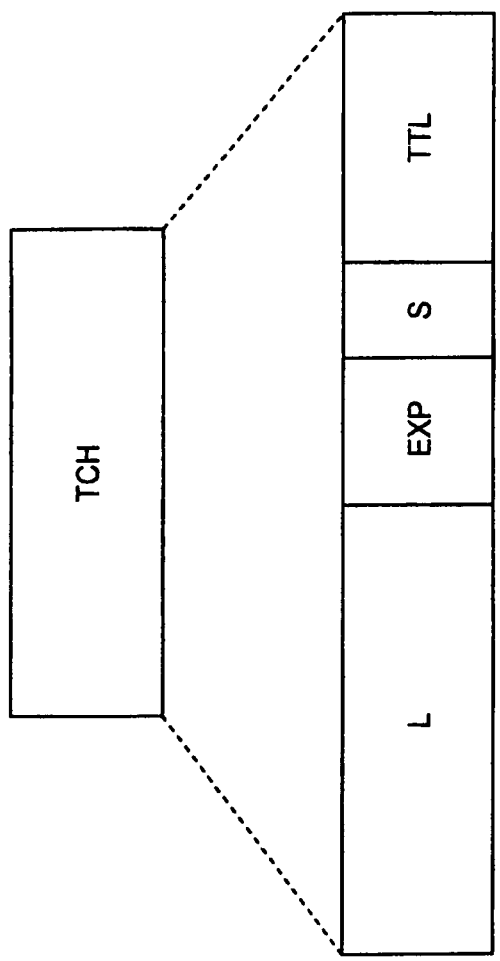
FIG. 3 schematically shows a tandem connection header.

FIG. 3 schematically shows the structure of a tandem connection header TCH according to an embodiment of the present invention. Such a tandem connection header TCH comprises a label field L, an experimental use field EXP, a stack field S and a Time To Live field TTL. According to an embodiment of the present invention, the size of each field is compliant with MPLS RFC3032, January 2001, i.e. the field L size is 20 bits, the field EXP size is 3 bits, the field S size is 1 bit and the field TTL size is 8 bits.

According to embodiments of the present invention, the tandem connection header TCH inserted in a packet preferably comprises, in the label field L, a tandem connection label having a predefined value. Such a predefined value should be different from the above cited predefined value 14 of the label comprised in OAM headers.

According to other embodiments of the present invention, the tandem connection header TCH inserted in a packet preferably comprises, in the experimental use field EXP, a predefined value. Such a predefined value should be preferably different from "000", which is the current standard value inserted in field EXP both of switching headers and of OAM headers. Preferably, the label field L comprises the same predefined value 14 which is currently used for OAM headers. Therefore, OAM headers and tandem connection headers only differ for their field EXP value. This advantageously allows to avoid reserving a label value for tandem connection monitoring, thus preserving all available label values (except 14) for switching purposes.

By still referring to FIG. 2, such Figure shows respectively a flow of user packets (U1, U2, . . . , U8 on the upper row), a flow of path OAM packets (P1, P2, . . . , P8 on the intermediate row), and a flow of tandem connection OAM packets (T4, T5 on the lower row), which are processed according to the present invention.

Reference can be initially made to the flow of user packets U1, U2, . . . , U8, which is generated by the node 1 and received by the node 9.

The node 4 receives the packet U3 from the node 3 and it calculates the new switching header H4. As the node H4 is a tandem connection input node, according to the present invention, it inserts a tandem connection header TCH after the switching header H4. The node 4 therefore obtains the packet U4, which is sent to the node 5. The switching header H4 is then the most external header in the packet U4. It is substantially unchanged relative to the header H3, except for the label value and the stack bit value, which is set to "1", so that it indicates the presence of a further header.

The node 5 receives the packet U4 from the node 4 and it calculates the new switching header H5, thus obtaining a packet U5, which is sent to the node 6.

When the node 6 receives the packet U5, it calculates the new switching header H6 and, as the node 6 is a tandem connection output node, it removes the header TCH. Also in this case, the switching header H6 is substantially unchanged relative to the switching header H5, except for the label value and the stack bit value, which is set equal to "0", so that it indicates that there is no successive header.

According to embodiments of the present invention, the above described processing is applied also to the flow of path OAM packets P1, P2, . . . , P8 generated by the node 1 for monitoring the whole LSP path between the node 1 and the node 9.

Indeed, in FIG. 2 it can be observed that the path OAM packets P1, P2, . . . , P8 (shown on the intermediate row in FIG. 2) have switching headers H1, H2, . . . , H8 and TCH header which are identical to the ones of the corresponding user packets U1, U2, . . . , U8. In addition relative to the corresponding packets U1, U2, . . . , U8, such packets P1, P2, . . . , P8 comprise the above cited OAM header, indicated in FIG. 2 as OAMH. Packets P1, P2, . . . , P8 then comprise an OAM payload, which is indicated in FIG. 2 as OAMP.

According to embodiments of the present invention, the value of the label comprised in the tandem connection header TCH is different from the value of the label comprised in the header OAMH.

Reference should now be made to lower row of FIG. 2. As already mentioned, the operator A, for monitoring the tandem connection TC, inserts along the LSP path a flow of tandem connection OAM packets through the input node of the tandem connection TC, i.e. the node 4. Such tandem connection OAM packets are indicated in FIG. 2 as T4. Each packet T4 generated by the node 4 comprises the switching header H4, the header OAMH, and a payload OAMP.

As the node 5 receives a packet T4 from the node 4, it calculates the new switching header H5, but it does not insert any header TCH, since such a packet T4 has been generated inside the tandem connection TC. It then sends the so obtained packet T5 to the node 6.

Therefore, the node 6 receives path OAM packets P5 having a header TCH, which are adapted to monitor the whole LSP path. On the other hand, the node 6 receives tandem connection OAM packets T5 having no header TCH, which are adapted to monitor the tandem connection TC.

Therefore, the node 6, by checking the presence or the absence of the header TCH in each received packet P5, T5, is capable of distinguishing path OAM packets P5, to be forwarded to the node 7 for monitoring the LSP path, and tandem connection OAM packets T5, to be extracted from the LSP path and processed directly for monitoring the tandem connection TC.

More particularly, the node 6 forwards path OAM packets comprising a TCH header to the node 7. It can be noticed that during this step the node 6 also removes the header TCH of the path OAM packet, since the node 6 is the output node of the tandem connection TC. Therefore, the node 9 receives and processes OAM packets compliant with the standard, without any additional header.

On the other hand, the node 6 extracts from the LSP path tandem connection OAM packets T5, which do not comprise any header TCH. Also in this case, the node 6 processes OAM packets which are compliant with the standard, without any additional header.

Figure 4:
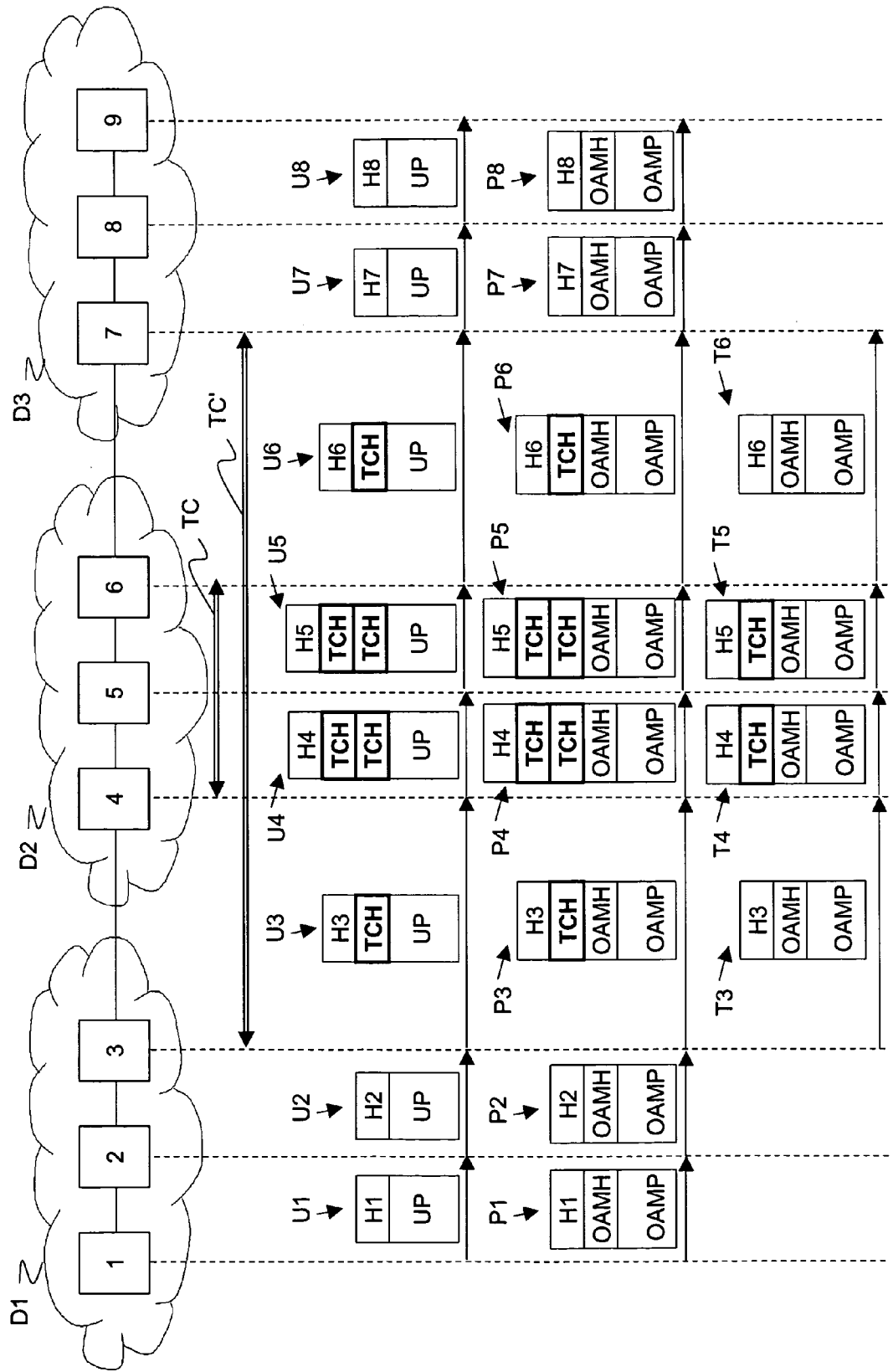
FIG. 4 schematically shows a second example of the method of monitoring a tandem connection applied to the network of FIG. 1, according to the present invention.

FIG. 4 shows a second example of the method of monitoring a tandem connection according to an embodiment of the present invention, wherein the domain D2 is managed by a second operator B.

Also in this case, the first operator A wishes to monitor the tandem connection TC. However, in this case, the first operator A is not allowed to access nodes 4 and 6, and therefore it is not allowed to insert and extract flows of tandem connection AOM packets through the nodes 4 and 6.

In this case, the first operator A identifies a second tandem connection TC', which comprises the tandem connection TC to be monitored and which have an input node and an output node accessible by the first operator A.

For instance, the second tandem connection TC' may be the tandem connection 3-4-5-6-7 which in shown in FIG. 4.

Therefore, there are two nested tandem connections: a first tandem connection TC, with input node 4 and output node 6 which are accessible by the operator B, and a second tandem connection TC' comprising the tandem connection TC, with input node 3 and output node 7 which are accessible by the operator A.

In this case, the first operator A inserts on the LSP path the monitoring flow of the tandem connection TC through the input node 3, ad it extracts it from the LSP path through the output node 7.

Moreover, each tandem connection input node (i.e. nodes 3 and 4) is adapted to insert a tandem connection header in any packet (user packet, path OAM packet, and tandem connection OAM packet) received from the node which precedes it in the LSP path. Similarly, each tandem connection output node (i.e. nodes 6 and 7) is adapted to remove a tandem connection header from any packet (user packet, path OAM packet, and tandem connection OAM packet) received from the node which precedes it in the LSP path.

As already described with reference to FIG. 2, also in this case tandem connection input nodes are adapted to insert the tandem connection header after the switching header already comprised in the received packets.

For instance, FIG. 4 shows a flow of user packets (U1, U2, . . . , U8, upper row), a flow of path OAM packets (P1, P2, . . . , P8, intermediate row) and a flow of tandem connection OAM packets (T3, . . . , T6, lower row), respectively, which are processed according to embodiments of the present invention.

Firstly, reference can be made to the flow of user packets U1, U2, . . . U8 generated by the node 1 and received by the node 9.

When the node 3 receives a packet U2 from the node 2, it calculates the new switching header H3 and, as the node 3 is the input node of the tandem connection TC', the node 3 inserts a tandem connection header TCH in the received user packet, whose label preferably has a predefined value. Preferably, the header TCH is inserted after the header H3. The node 3 forwards the so obtained packet U3 to the node 4.

The node 4 receives the packet U3 from the node 3, and it calculates the new switching header H4. Moreover, as the node 4 is the input node of the tandem connection TC, also the node 4 inserts a tandem connection header TCH in the received user packet. Such a header TCH is preferably identical to the one inserted by the node 3. Therefore, the user packet U4 sent by the node 4 and received by the node 5 will have two identical consecutive headers TCH, which are preferably placed after the header H4 (which is still the most external header).

The node 5 receives the packet U4 from the node 4, and it calculates the new switching header H5, thus obtaining a packet U5, which is sent to the node 6.

When the node 6 receives the packet U5, it calculates the new switching header H6 and, as the node 6 is the output node of the tandem connection TC, one of the headers TCH is removed from the user packet. Preferably, the header which is closer to the switching header is removed. In this way, the stack bit value is kept unchanged. The node 6 then sends the so obtained packet U6 to the node 7.

When the node 7 receives the packet U6, it calculates the new switching header H7 and, as the node 7 is the output node of the tandem connection TC', the remaining header TCH in the packet U6 is removed. The so obtained packet U7 is then forwarded to the node 8, and then to the node 9, wherein it is received and processed in a traditional way.

The above described processing also applies to the flow of path OAM packets P1, P2, . . . , P8 generated by the node 1 for monitoring the whole LSP path between the node 1 and the node 9.

Indeed, by referring to FIG. 4, it can be noticed that the path OAM packets P1, P2, . . . , P8 have switching headers H1, H2, . . . H8 and tandem connection headers TCH identical to the corresponding user packets U1, U2, . . . , U8.

Reference can now be made to the lower row of FIG. 4. As already mentioned, the operator A, for monitoring the tandem connection TC, inserts along the LSP path a flow of tandem connection OAM packets through the input node of the tandem connection TC', i.e. the node 3. Such packets are indicated in FIG. 4 as T3. Each packet T3 generated by the node 3 comprises the switching header H3, the header OAMH and a payload OAMP.

When the node 4 receives a packet T3 from the node 3, it calculates the new switching header H4 and, as the node 4 is the input node of the tandem connection TC, it inserts a tandem connection header TCH after the header H4, thus obtaining a packet T4.

The packet T4 is then forwarded to the node 5, which calculates the new switching header H5, and it sends the so obtained packet T5 to the node 6.

As the node 6 receives such a packet T5, it calculates the new switching header H6 and, as the node 6 is the output node of the tandem connection TC, it removes the header TCH from the packet T5, thus obtaining a packet T6, which it is sent to the node 7.

The node 7 then receives path OAM packets P6 having a header TCH and being adapted to monitor the whole LSP path. On the other hand, the node 7 of the operator A receives tandem connection OAM packets T6 having no header TCH, and being adapted to monitor the tandem connection TC.

Therefore, the node 7, by checking either the presence or the absence of the header TCH in each received AOM packet P6, T6, is capable of distinguishing path OAM packets P6, to be forwarded to the node 8 for monitoring the LSP path, and tandem connection OAM packets T6, to be extracted from the path LSP and to be directly processed for monitoring the tandem connection TC.

More particularly, the node 7 forwards to the node 8 path OAM packets, which comprise a header TCH. It can be noticed that during this step the node 7 removes also the header TCH from the path OAM packet, the node 7 being the output node of the tandem connection TC'. The node 9 therefore receives and processes standard OAM packets, without any additional header.

On the other hand, the node 7 extracts from the LSP path tandem connection OAM packets which do not comprise any header TCH, and directly processes them. Also in this case, the node 7 processes standard OAM packets, without any additional header.

Therefore, the present invention has the following advantages.

First of all, the information allowing to distinguish path OAM packets and tandem connection OAM packets, and thus allowing the operator A to monitor at the same time both the whole path and the tandem connection, is a tandem connection header. Therefore, for distinguishing path and tandem connection OAM packets, each node simply has to consider the header of the received OAM packets, without the need of processing their payload.

On one hand, this makes the method according to the present invention compatible with current MPLS apparatuses and, on the other hand, this reduces both the amount of resources (memory, CPU, etc.) required for such an operation and the processing time.

A further reduction of processing complexity can be achieved by having tandem connection headers identical for all the nodes and for all the packet types.

Moreover, as the tandem connection header is inserted after the switching header, switching mechanisms along the LSP path are unchanged.

Moreover, all the packets are processed by nodes in the same way, both user packets, and OAM packets. Also this advantageously helps in reducing processing complexity at each node, as each node is not required to distinguish different types of packets, but it simply performs the same operation on all the received packets.

Moreover, all the packets (user packets, path OAM packets and tandem connection OAM packets) are received by the respective termination node which has to process them without neither any additional header nor any additional payload field with respect to the standard format of an MLPS packet. Advantageously, then, nodes performing packet processing, and in particular payload processing, do not have not be modified with respect to current MPLS nodes.

Moreover, advantageously, the method according to the invention allows the first operator A and the second operator B to monitor substantially at the same time the LSP path section comprised between nodes 4 and 6, which is managed by the second operator B.

Figure 5:
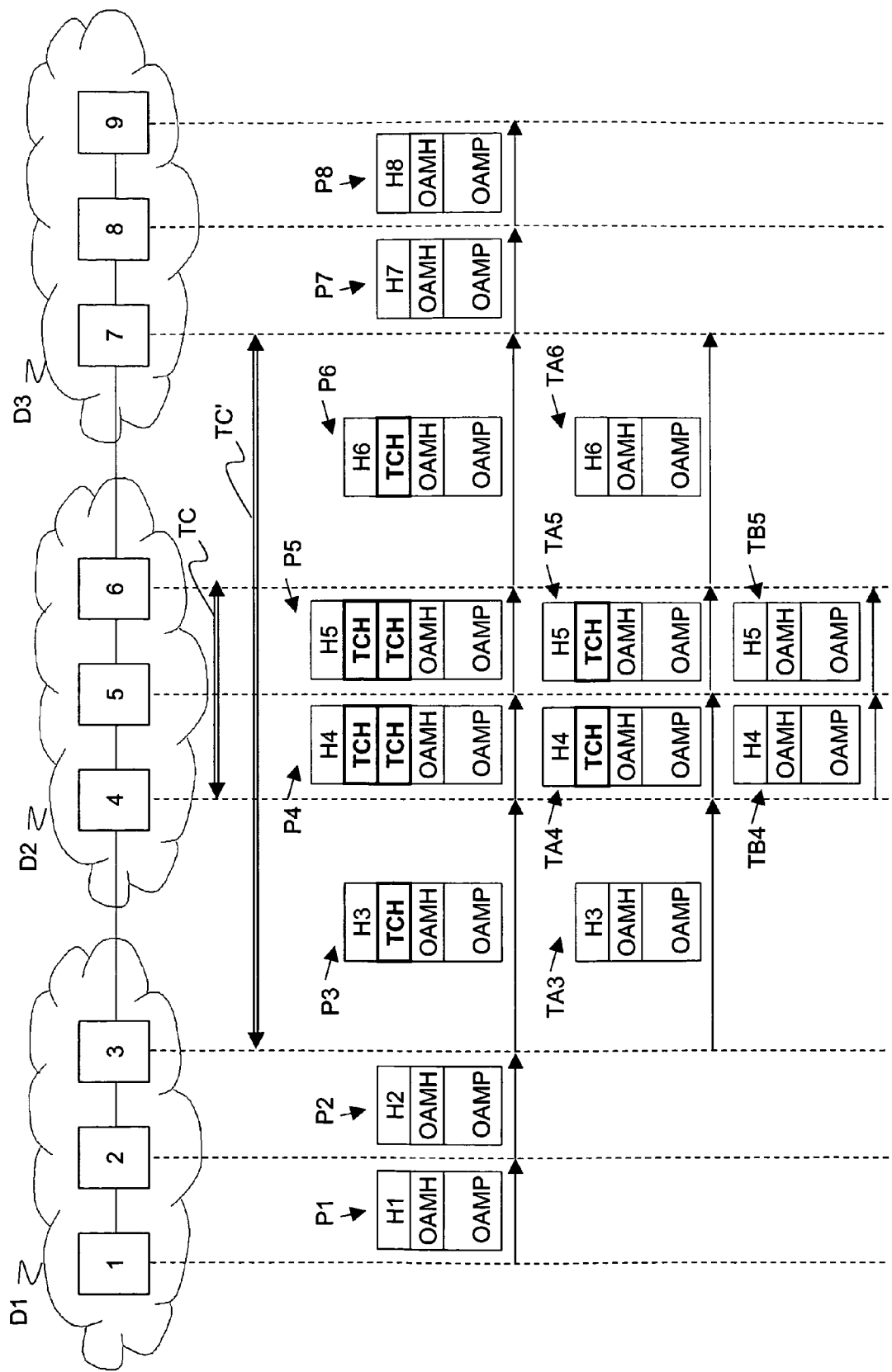
FIG. 5 schematically shows a third example of the method of monitoring a tandem connection applied to the network of FIG. 1, according to the present invention.

FIG. 5 shows a third example of the method of monitoring a tandem connection applied to the network of FIG. 1 according to an embodiment of the present invention.

In the example of FIG. 5, it is assumed that the first operator A wishes to monitor both the whole LSP path between node 1 and node 9, and the tandem connection TC managed by the second operator B. At the same time, also the second operator B wishes to monitor its own tandem connection TC.

In the following description, the expression "path OAM packets" will still refer to OAM packets generated by the node 1 for monitoring the LSP path. The expression "tandem connection OAM packets A" will indicate OAM packets generated by the operator A for monitoring the tandem connection TC. The expression "tandem connection OAM packets B" will indicate OAM packets generated by the operator B for monitoring the tandem connection TC.

Similarly to the example of FIG. 4, for monitoring the LSP path, the operator A transmits along the LSP path from node 1 a flow of path OAM packets, indicated as P1, P2, ..., P8 in FIG. 5. Similarly, as in the example of FIG. 4, the operator A inserts along the LSP path a flow of tandem connection OAM packets A through the node 3, per monitoring the tandem connection TC, which are indicated as TA3, ..., TA6 in FIG. 5.

Moreover, in the example of FIG. 5, the operator B inserts along the path LSP a flow of tandem connection OAM packets B through the node 4, for monitoring the tandem connection TC, which are indicated as TB4, TB5 in FIG. 5.

All the three OAM packet flows and the user packet flow are processed by each node according to the above operations, described by referring to FIGS. 2 and 4, i.e.:

each input node of a tandem connection (3 and 4) inserts a tandem connection header TCH after the switching header H1, H2, ..., H8 of each received packet; and each output node of a tandem connection (6 and 7) removes a tandem connection header TCH from each received packet.

In FIG. 5, for simplicity, the user packet flow is not shown.

Therefore, by referring to the first row of FIG. 5 (P1, P2, ..., P8) it can be noticed that the node 3 inserts a first header TCH in each received packet P2, and it forwards the so obtained packet P3 to the node 4. Similarly, the node 4 inserts a second tandem connection header TCH in each received packet P3, and it forwards the so obtained packet P4 to the node 5. The node 5 receives the packet P4, it modifies its switching header and it forwards the so obtained packet P5 to the node 6. The node 6 removes a header TCH from each received packet P5 (preferably, the one closest to the switching header), and it forwards to the node 7 the packet P6 so obtained. The node 7 extracts the remaining header TCH from each received packet P6 and it forwards to the node 8 the packet P7 so obtained.

By referring now to the second row of FIG. 5 (TA3, . . . , TA6), the node 4 inserts a TCH header in each received packet TA3, and it forwards to the node 5 the packet TA4 so obtained. The node 5 receives the packet TA4, it modifies its switching header and it forwards the packet TA5 so obtained to the node 6. The node 6 removes the header TCH from each received packet TA5, and it forwards the packet TA6 so obtained to the node 7.

Finally, by referring to the last row of FIG. 5 (TB4, TB5), the packets TB4 inserted by the operator B through the node 4 are generated inside the tandem connection TC, which does not contain any further tandem connection. Therefore, nodes do not insert further headers TCH to such packets.

Consequently, when the node 6 receives an OAM packet P5, TA5, TB5, it processes the headers of the received OAM packet. If the received OAM packet does not include any header TCH, the node 6 recognizes such an OAM packet as a tandem connection OAM packet B, it extracts it from the LSP path and it processes it. On the other hand, if the received OAM packet comprises at least one header TCH, the node 6 recognizes such an OAM packet either as a path OAM packet or as a tandem connection OAM packet A, and it forwards (as packet P6 or TA6) to the node 7.

Therefore, when the node 7 receives an OAM packet P6 or TA6 from the node 6, it processes the header of the received OAM packet. If the received OAM packet comprises a single header TCH, the node 7 recognizes the OAM packet as a tandem connection OAM packet A TA6, it extracts it from the LSP path and it processes it. On the other hand, if the received OAM packet comprises two headers TCH, the node 7 recognizes such a OAM packet as a path OAM packet P6, and it forwards it to the node 8 as a packet P7.

It is obvious that the example of FIG. 5 may be extended to examples wherein the LSP path of a first operator comprises a tandem connection managed by a second operator, which in turn comprises a further tandem connection which is managed by a third operator.

The invention may also apply to a situation wherein an LSP path of a first operator comprises a plurality of cascaded tandem connections, which may be adjacent or non adjacent; each tandem connection being managed by a different operator.

Similarly, the invention may also be applied to a situation wherein an LSP path of a first operator comprises a plurality of cascaded tandem connections, which are all managed by a same second operator.

The invention claimed is:

1. A method of simultaneously monitoring, in a Multi-Protocol Label Switching network, both a label switched path and a tandem connection of said label switched path, said tandem connection comprising a sequence of succeeding nodes being a section of said label switched path, said tandem connection to be monitored having an input node and an output node, said method comprising:
receiving a first Operation, Administration and Management, OAM, packet at the input node, said first OAM packet having a switching header and an OAM header;
processing at the input node said first Operation, Administration and Management, OAM, packet to provide a recalculated switching header and an additional tandem connection header located between and being different from said switching header and said OAM header;
generating at the input node a second Operation, Administration and Management, OAM, packet having a switching header and an OAM header but no additional tandem connection header;
sending towards said output node both
said first OAM packet and
said second OAM packet;
at said output node, identifying said second OAM packet according to the absence of said tandem connection header, and extracting said second OAM packet from said label switched path for monitoring said tandem connection; and
at said output node, identifying said first OAM packet according to the presence of said tandem connection header and forwarding said first OAM packet along said label switched path, without the tandem connection header and with the switching header of the first OAM packet recalculated for said forwarding, for monitoring said label switched path.

2. The method of claim 1, wherein the switching header, the tandem connection header, and the OAM header are compliant with a label stacking mechanism defined for said Multi-Protocol Label Switching network.

3. The method of claim 1, wherein said switching header comprises a label field carrying a label respectively calculated to be processed by the next node receiving the OAM packet.

4. The method of claim 3, wherein said tandem connection header comprises a label field.

5. The method of claim 4, wherein the label field of said tandem connection header remains unchanged at each intermediate node along said tandem connection.

6. The method of claim 3, wherein said switching header is re-calculated at each intermediate network node to insert a new label adapted to be processed by the next node along the label switched path.

7. The method of claim 1, wherein the input node is adapted to provide a tandem connection header in any user packet and any OAM packet received from said label switched path and to forward any such packet towards the output node.

8. A Multi-Protocol Label Switching network node, being part of a label switched path to be monitored, and being an input node of a tandem connection to be simultaneously monitored, said tandem connection comprising a sequence of succeeding nodes being a section of said label switched path, said network node having processing resources including memory and central processing unit (CPU) programmed and operable in accordance with an industry standard to receive at the node a packet having a label including a switching header and to calculate a new switching header which can be read by a second node next along the label switched path, said processing resources being further programmed and operable in accordance with the standard to receive an Operation, Administration and Management OAM packet, including an OAM header and a switching header, and to recalculate the switching header thereof and forward the OAM packet on the label switched path for monitoring the label switched path, and said processing resources being further programmed and operable in accordance with the standard to generate and forward an Operation, Administration and Management OAM packet,
said processing resources being further programmed and operable, upon receipt of a first Operation, Administration and Management OAM packet to be sent towards an output node of said tandem connection to be monitored, to process said first Operation, Administration and Management OAM packet to provide a recalculated switching header and, in addition, to provide a tandem connection header being located between and being different from the switching header and the OAM header, said processing resources being further programmed and operable to generate a second OAM packet having a switching header and an OAM header, but no additional tandem connection header, and to forward the second OAM packet and processed first OAM packets towards said output node, whereby said second OAM packet can be identified at the output node of said tandem connection according to the absence of said tandem connection header and the second OAM packet be extracted from said label switched path for monitoring said tandem connection, and said first OAM packet can be identified at the output node of said tandem connection according to the presence of said tandem connection header and be forwarded along said label switched path, without the tandem connection header, for monitoring said label switched path.

9. A Multi-Protocol Label Switching network comprising a label switched path and a tandem connection of said label switched path, said label switched path and said tandem connection to be simultaneously monitored, wherein said tandem connection has an input node according to claim 8, and an output node adapted to receive said first and second OAM packets, said output node having processing resources including a memory and central processing unit (CPU) programmed and operable to identify said second OAM packet according to said absence of a tandem connection header inserted at said input node.

10. The network node of claim 8, wherein the processing resources are programmed and operable to provide any said switching header, OAM header, and tandem connection header in compliance with a label stacking mechanism defined for said Multi-Protocol Label Switching network.

11. A Multi-Protocol Label Switching network node, being part of a label switched path to be monitored, and being an output node of a tandem connection to be simultaneously monitored, said tandem connection comprising a sequence of succeeding nodes being a section of said label switched path, said network node having processing resources including a memory and central processing unit (CPU) programmed and operable in accordance with an industry standard to receive at the node a packet having a label including a switching header and to calculate a new switching header which can be read by a second node next along the label switched path, said processing resources being further programmed and operable in accordance with the standard to receive an Operation, Administration and Management OAM packet, including an OAM header and a switching header external to the OAM header, said processing resources being programmed and operable, upon receipt by the network node of an Operation, Administration and Management OAM packet having an OAM header and switching header, to check the presence or absence of a tandem connection header being located between and being different from the switching header and the OAM header of the OAM packet, upon receipt by the network node of a first Operation, Administration and Management OAM packet, generated upstream of an input node of said tandem connection to be monitored, and having an OAM header and switching header and having, in addition, a tandem connection header, said processing resources being programmed and operable to identify said first OAM packet according to the presence of said tandem connection header and to forward the first OAM packet along said label switched path, without the tandem connection header, for monitoring said label switched path, and upon receipt by the network node of a second OAM packet, generated at said input node of the tandem connection to be monitored and having an OAM header and switching header but no tandem connection header therebetween, said processing resources being programmed and operable to identify said second OAM packet according to the absence of a tandem connection header, and to extract the second OAM packet from said label switched path for monitoring said tandem connection.

* * * * *